(12) United States Patent
Bass et al.

(10) Patent No.: US 6,473,838 B1
(45) Date of Patent: Oct. 29, 2002

(54) DATA TRANSFER SYSTEM FOR MULTIPLE NETWORK PROCESSORS USING DUAL DRAM STORAGE

(75) Inventors: Brian Mitchell Bass, Apex; Jean Louis Calvignac, Cary; Marco C. Heddes, Raleigh; Steven Kenneth Jenkins, Raleigh; Michael Steven Siegel, Raleigh; Michael Raymond Trombley; Fabrice Jean Verplanken, both of Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,576

(22) Filed: Jan. 4, 2000

(51) Int. Cl.[7] ............................................... G06F 12/00
(52) U.S. Cl. ....................................... 711/151; 711/169
(58) Field of Search ................................. 711/105, 151, 711/148, 169

(56) References Cited

U.S. PATENT DOCUMENTS

| | | | |
|---|---|---|---|
| 5,910,928 A | 6/1999 | Joffe | 365/230.05 |
| 5,920,511 A | 7/1999 | Lee et al. | 365/189.05 |
| 5,926,839 A | 7/1999 | Katayama | 711/169 |
| 5,933,372 A | 8/1999 | Seyyedy et al. | 365/189.05 |

*Primary Examiner*—Kevin Verbrugge
(74) *Attorney, Agent, or Firm*—Dirggs, Lucas, Brubaker & Hogg LPA; James A. Lucas

(57) ABSTRACT

The ability of network processors to move data to and from dynamic random access memory (DRAM) chips used in computer systems is enhanced in several respects. In one aspect of the invention, two double data rate DRAMS are used in parallel to double the bandwidth for increased throughput of data. The movement of data is further improved by setting 4 banks of full 'read' and 4 banks of full 'write' by the network processor for every repetition of the DRAM time clock. A scheme for randomized 'read' and 'write' access by the network processor is disclosed. This scheme is particularly applicable to networks such as Ethernet that utilize variable frame sizes.

15 Claims, 2 Drawing Sheets

DATA TRANSFER SYSTEM FOR MULTIPLE NETWORK PROCESSORS USING DUAL DRAM STORAGE

BACKGROUND OF INVENTION

1. Field of the Invention

The present invention relates to a Double Data Rate DRAM (DDR DRAM) based electronic computer memory system, and more specifically to upgrading the data transfer rate in a DRAM.

2. Background Art

The main memory of a computer stores the data and program required by a central processing unit for executing instructions for a given task. The time required to access data stored in the main memory detracts from the time available to execute instructions, and slows down the overall opening speed of the computer. Anything that reduces the time for memory access serves to increase the operating speed of the computer. The main memory is stored in semiconductor memory devices called Random Access Memory (RAM) devices. The two most common types of RAM are DRAM or Dynamic Random Access Memory and SRAM or Static Random Access Memory. Each device has its advantages and its disadvantages.

Network processors are becoming more important in the computer world for their ability to forward, route, and filter frames comprising defined length sequences of bits of information. As bigger networks are built, the network processor needs the ability to service more and more traffic and the bandwidth requirements continue to increase. In order to build a network processor that can handle several gigabit ports, previous designs relied on SRAM for data storage in order to keep up with the high bandwidth requirements to transmit large quantities of data per unit of time. However, SRAM drove up the costs of those solutions, and cheaper solutions were pursued. DRAM has the advantages of lower costs and larger array sizes which would help with the larger data stores needed by the network processors. There are several disadvantages associated with the use of DRAM chips. One is their high latency during 'read' or 'write' access (several cycles delay in order to address the DRAM). Another disadvantage is the complex rules concerning reading and writing the memory. RAS and CAS rules limit random access to the memory unlike the access that is possible with SRAMs. There is also the need to periodically refresh the memory every 2 ms or so due to the inherent capacitor leakage.

The newer Double Data Rate DRAMs (DDR DRAs) allow data to be transferred twice as fast as regular DRAMs by moving the data on both the rising and falling clock edge. Using this approach, data transferred on the rising edge and the falling edge of the clock, effectively doubles the bandwidth. These DDRs have speeds up to 133 MHz (and going higher) which allow up to 4.2 Gbit of raw bandwidth.

Using fixed sized buffers works well for network systems like ATMs which have fixed packet sizes. However, for networks like Ethernet, which have variable frame sizes, using the 64 byte buffers can cause a significant performance hit on the data store. For example, assume a 68 byte frame is stored in the data store. This would require 2 buffers to store the data, 2 'write' windows to 'write' the data to DRAM, and 2 'read' windows to read the data from DRAM. For purposes of describing the present invention, 'window' is defined as a time slot during which a read or write operation is being performed to or from the DRAM. The system bandwidth is cut almost in half in order to op this 68 byte frame. Since the DRAM has complex rules concerning RAS and CAS and does not support completely random access, the DRAM bandwidth would be lost when accessing the 68 byte frame if something was not done to compensate for this situation.

SUMMARY OF THE INVENTION

One objective of the present invention is the use of a DRAM system to provide increased storage and data transfer rates for network processors.

Another objective is to achieve wider bandwidth transfer of data for use by network processors, Still another objective is the control of the movement of data needed by the network processor to maximize the number of clock cycles used for data transfer to and from a DRAM.

Yet another objective is to have the capability of arbitrating the service of multiple frames by the network processor.

Finally, it is an objective to be able to randomize DRAM 'read' and 'write' access.

These and other objectives that will become self evident to one skilled in the art upon reading and understanding this description are achieved in the following manner.

An improved data transfer system for a network processor uses a dynamic random access memory chip (DRAM) including one or more of the following features: a) A pair of Double Data Rate DRAMS in parallel, each capable of moving data on each edge of a time clock; b) A Time-Division-Multiplexer to allow 4 banks of data to be read by the network processor followed by 4 data banks to be written during each time cell, and c) Valid Bank Vectors useful with varying size data frames to increase overall bandwidth of the DRAM dependent on the length of the frame.

More particularly, the invention relates to an improved data transfer system for a plurality of network processors using a dynamic random access memory (DRAM) storage. The system includes a pair of Double Data Rate DRAM chips in parallel, each capable of moving data on both the rising and falling edges of a time clock. It also includes a multiplexer to allow 4 memory banks of data to be read by each network processor followed by 4 memory banks to be 'written' by each network processor during one 20 cycle cell of the time clock. The system further includes a serial bus and pipelines for the transfer of the 'read' data and the 'write' data between the DDR DRAMS and the respective network processor. Preferably, it utilizes a plurality of fixed size data store buffers, with each buffer having a 64 byte capacity. Each memory bank comprises ¼ of the data store. The system can also include a priority program that allows random access for 'read' and 'write' to the DDR DRAM.

In another aspect of the invention, a method is described for storing and moving data for use by a network processor. The method includes the steps of: a) storing the data in first and second DDR DRAM chips working in tandem and having synchronized clocks; b) establishing a data movement pattern comprising a predetermined number of cycles in each repeating cell of the DDR DRAM clocks; c) dedicating a contiguous group of cycles in the pattern to full 'read' during a 'read' window; and d) dedicating a second contiguous group of cycles in the pattern to full 'write' during a 'write' window. The method may include the additional step of storing data from each read window or from each write window into one of a plurality of buffers. Each window preferably comprises a burst of 64 bytes of data and each buffer has a store capacity of 64 bytes. The data is pipelined to allow 4 banks to be read during the 'read' window, followed by 4 be to be written during the 'write' window. Each bank preferably comprises ¼ of the of the data store. The data is read or is written in bursts of 64 bytes.

The invention flier comprises an arbitration system for a network processor and the method for providing a high bandwidth data movement for multiple frames being serviced by the network processor. The system comprises establishing time slots or windows for reading each of the four banks (labeled a, b, c, and d) in the DRAM chip and time slots for writing each of the four banks. The system then determines which of the banks needs to be read and which of the banks need to be written for a given five. It accesses the bank during the appropriate read or write time slots that are required by said given frame. It then reviews all frames needing 'read' access during a given period of time and arbitrates for all 'a' banks between all frames needing 'read' access to the 'a' bank. In similar fashion, it arbitrates for all 'b', 'c', and 'd' banks for a frame requiring access to the other banks. Then, it repeats the steps of reviewing the frames and arbitration for all other flumes needing 'write' access.

Finally, the invention includes a method of providing a network sensor with random 'read' and 'write' access to a DRAM. This method comprises the steps of; sequencing the 'read' and 'write' access to a plurality of banks a, b, c, and d of a DRAM chip. During the 'read' step, arbitration is used to give priority to bank 'a' for any read commands that need to be fulfilled. If no 'read' access is available in bank 'a' the bank is given access to a 'write' command and bank 'b' is then given a 'write' command as well. If the access to bank 'b' is different than the access to bank 'a', bank 'b' is bypassed in favor of bank 'c' since there is not a sufficient time delay between the two adjacent banks to switch between 'read' and 'write'. When the system skips to bank c, it modifies the arbitration to give priority to bank 'c' whether it is read or write. By then sufficient time will have elapsed to allow the system to switch from 'read' to 'write'. In this manner, the system can accommodate the data exchange through this bank whether it is 'read' or 'write'. These steps are repeated during a 'write' window. This technique of random access is particularly useful for processing control information.

DETAILED DESCRIPTION OF THE INVENTION

Figure 1:
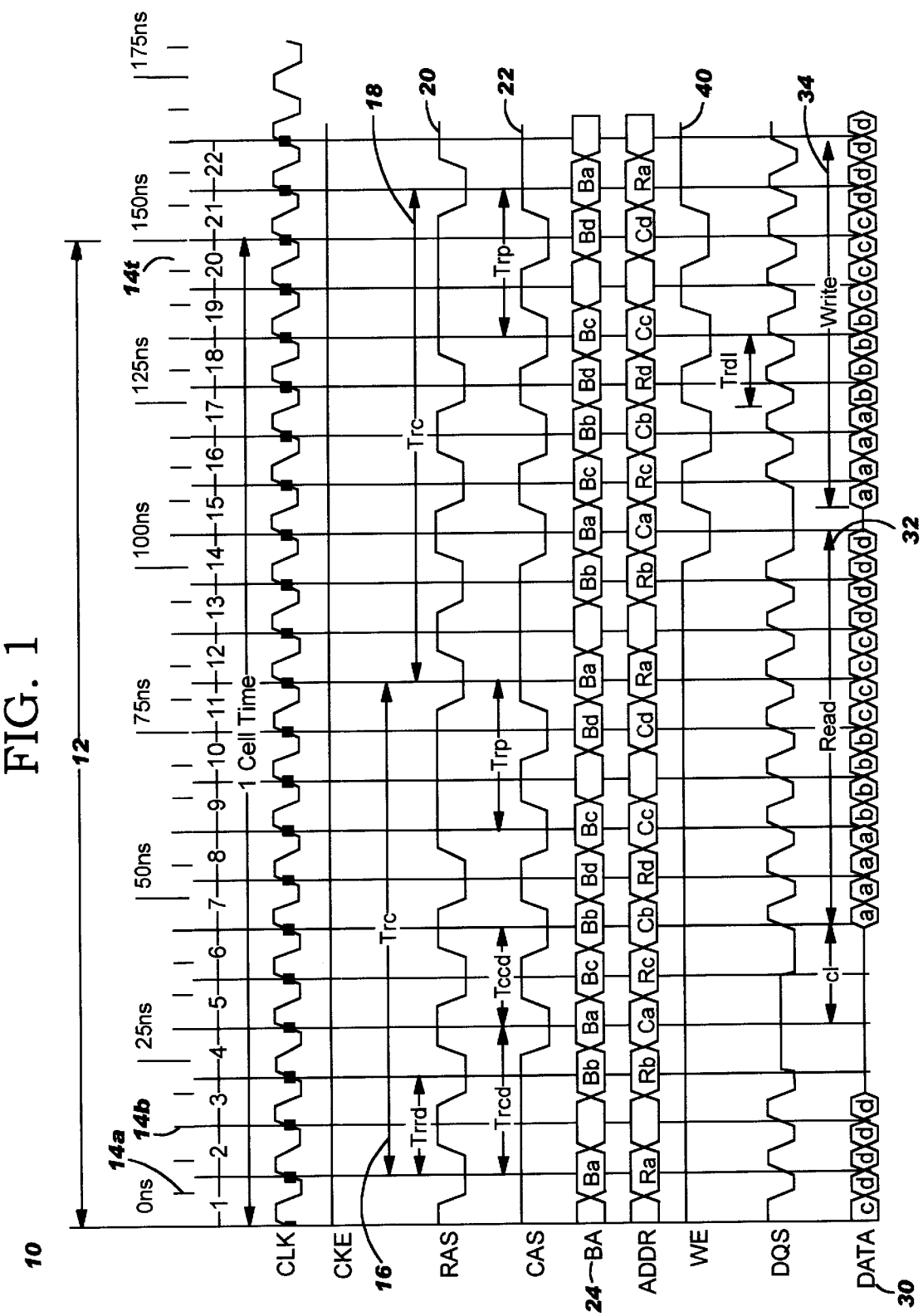
FIG. 1 is a typical timing diagram of a DRAM chip including features of the present invention.

When the network processor is using the DRAM in "full 'read'" or "full 'write'" windows, all the requests to the DRAMs are placed into a Time Division-Multiplex (TDM) scheme. TDM is a form of multiplex transmission that follows logically from the adoption of pulse modulation and processes involving sampling. There are time gaps between pulses and these gaps produce a signal that allows other pulses to be interleaved. The extraction of the desired signal at a receiver requires a system operating in synchronization with the transmitter. It should be understood that the interface between the network processor and the DRAM is bi-directional whereby both devices multiplex and extract. Within the framework of the present invention, the TDM allows 4 banks of data to be 'read' by the network processor followed by 4 banks being written by the network processor. The 'read' are pipe-lined to allow 4 banks of 'read' in a 20 cycle cell. The 'writes' are also pipelined to allow 4 banks written every 20 cycles. This TDM scheme allows the network processor 1.7 Gbit of 'read' bandwidth and 1.7 Gbit of 'write' bandwidth. Only 4 cycles out of 20 are not used for moving data. Using the DRAM with this TDM allows the most bandwidth, while still allowing the network processor to schedule both 'read' and 'write' transfers in a timely manner (20 cycle repeating window). This TDM scheme works well for the data movement needed by the network processor. The network processor is able to store 1.7 Gbps into the data store, and retrieve 1.7 Gbps from the data store. Most network processors require that a frame be stored into data store, the header read, the frame processed/modified, and the resultant frame sent to the designation port. The extra overhead of reading the header and processing/modifying the frame uses up part of the total 'read' and 'write' bandwidth. To support a Gbit Ethernet port would require somewhere around 1.5 Gbps 'read' bandwidth and 1.5 Gbps 'write' bandwidth. To support more ports, more memories would have to be added. Each memory uses up a certain number of I/Os on the network processor, which in tun increases the cost Additional savings would benefit the system costs.

In order to meet the DRAM rules, and still support high-bandwidth network data movement, the invention uses two DDR DRAMs each with a burst size of four data events. Each data element comprises the width of the bus, which is 16 bits (16 bits*4*2=128 bits), and each bank of the memory makes up ¼ of the data store buffer. Therefore, the data store is made up of 64 byte buffers, where the DDR is 'read' in bursts of 64 bytes ('read' aaaa, bbbb, cccc, dddd above) or written in bursts of 64 bytes ('write' aaaa bbbb, cccc, dddd above). Each of the letters represents one data element from the bank labeled with the same letter. In addition to this, two sets of DRAMs are used with opposite read/write time slots. Therefore the invention allows one buffer to be written each window and one buffer to be read each window. This commands to 6.8 Mbps. full duplex, which is enough to support several Gbit ports.

In order to overcome the limitation of always having to access the four banks in order, the present invention uses what are called Valid Bank Vectors (VBV). VBV can be used as long as several frames are being serviced by the network processor. The network processor keeps up with which banks are needed by the frame(s) and only accesses the required banks for a given frame. The network processor has an arbitration scheme that looks at all frames that need reading in a given time frame and arbitrates for all 'a' banks between any frame that needs an 'a' access. It also arbitrates for all 'b', 'c', and 'd' banks, therefore only fetching the necessary banks for any given frame and never wasting any DRAM bandwidth. As soon as all of the banks for a given buffer have been processed, the network processor can then move on to the next buffer of the frame (or next frame, if at the end of the current frame). The VBV scheme can be used for both reading and writing, therefore reducing any wasted bank access to the DRAM. Using the VBV scheme effectively increases the overall usable bandwidth of the DRAM by 75% (assuming that the average frame uses 1.5 buffers) for small frames and by 1% for long frames. Frame sizes in-between these two extremes will benefit somewhere between 75% and 1% depending on actual frame size.

Referring now to FIG. 1, a DRAM chip timing diagram 10 that supports a full read and a fill write program is shown. This diagram shows one cell 12 of 20 cycles 14a–14t of a 133 Mhz clock. Ten contiguous cycle represent the 'read' window and the next ten windows form the 'write' window 18. It should be noted that for random access, it is possible that some of the 'reads' may be turned into the 'write' window and visa versa. The row address strobe (RAS) 20 and the column address strobe (CAS) 22 are shown. The RAS and CAS lines describe the length of time it takes to read a row or a column of data. This time is called the RAS/CAS latency. Shorter latency times result in greater data transfer rates. Each time the RAS posts a low, it activates one of the banks of data shown in the BA line 24. The details and operation of the strobes is well known to those skilled in the art and require no further explanation.

At the bottom of FIG. 1 is data line 30 showing 4 banks 'aaaa', 'bbbb', 'cccc', and 'dddd' of data in the 'read' mode 32 and 4 banks 'aaaa', 'bbbb', 'cccc', and 'dddd' of data in the 'write mode 34. The write enable (WE) signal 40 precedes the write of each bank of 'write' data by one cycle.

Another scheme addressed by the invention is allowing the network processor "random" 'read' and 'write' access to the DRAM. Since "random" access reduces total bandwidth, this scheme preferably would not be used for data movement, but instead would be utilized for some type of control information. In order for the network processor to access the DRAM in a more random fashion, the network processor must sequence the necessary access to the DRAM as follows: Use the basic 'read' and 'write' windows as shown above. During the 'read' window, give priority to the VBV arbitration for any 'reads' that need to be performed. During the 'write' window, give priority to the VBV arbitration for any 'writes 'that need to be performed. By giving priority to different types of access, the DRAM cycle will be disturbed the least. If the network processor does not have the correct type of access to perform during a given bank access, then the bank access is given to another network processor. For the next bank, the arbitration will need to be modified. If the next bank access is similar to the last ('read' followed by 'read', or 'write' followed by a 'write'), then the system gives priority on an arbitration basis to a network processor having the similar access. If no similar access is available, then the system skips the next bank in order to fulfill the DRAM timing rules. This scheme allows the network processor to have "random-like" access while still fulfilling the DRAM rules.

This random-like access is particularly advantageous when dealing with the transfer of data by Ethernet. In Ethernet, the minimum frame size is 64 bytes of user data Added to this sum is at least 12 additional bytes of overhead for address and instructions. Typically, each frame is divided into packets of 64 bytes that are then Disassembled with separate addresses. According to the random access-type feature of the present invention, if a network processor does not have the correct type of access ('read' or 'write') for a given bank of data, then the system will search the other network processors to find one whose access matches that of the bank. If there are more than one, priority will be given to one of the processors based on an arbitration scheme so that the 'read' or 'write' opportunity is not bypassed and lost. The selected processor then reads the bank or writes to the bank after which the next bank is accessed. If the next bank is in the same 'read' or 'write' mode as the one just accessed, then priority is given to that bank. However, if it is not the same mode, this bank of data is skipped and access is given to the next bank, irrespective of its mode.

Figure 2:
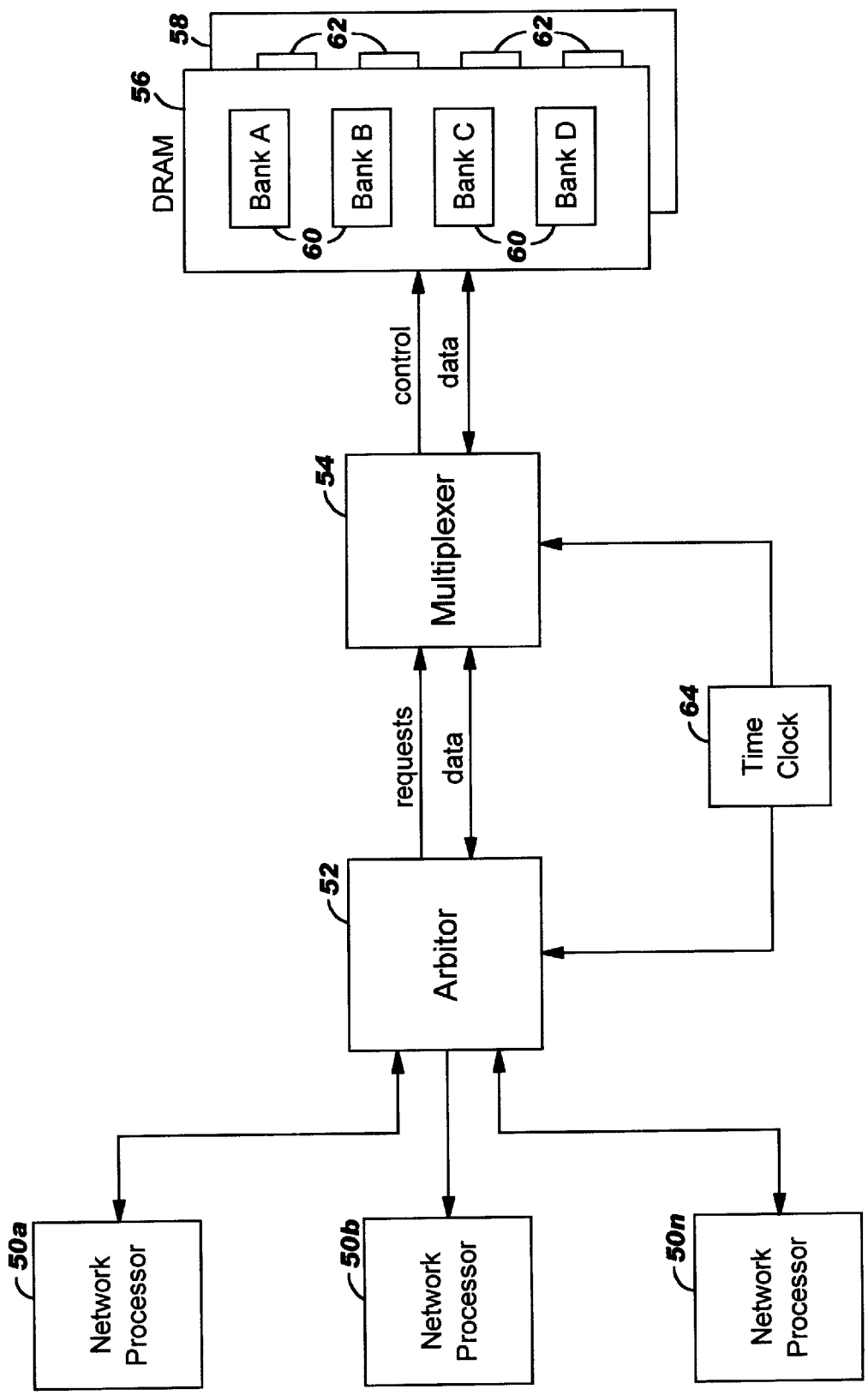
FIG. 2 is a block flow diagram of the present invention.

Referring now to FIG. 2, the dam transfer system includes a plurality of network processors 50a, 50b, 50n. Data flows between each network processor and a common arbitrator 52. Requests are sent by the arbitrator 52 to the multiplexer 54 and data passes between the two. The multiplexer controls the transmission of data into and out of memory banks 60 in the fat DRAM chip 56. In the same manner, the multiplexer 54 controls data transfer to and from the banks 62 in DRAM chip 58. The time clock 64 is, for example, a 133 Mhz clock that controls the timing of the read and write program for each DRAM chip.

Although the invention has been described in terms of the improved data transfer using a pair of DDR DRAMS, it should be understood that more than two DRAM chips can be used for an even wider bus and larger data transfer. However, as a practical matter, if the number of DRAM chips gets too large, the large amount of data that is being transferred cannot possibly be used in a timely manner, and bandwidth is being wasted. Also, the invention has been characterized in connection with a 20 cycle DRAM time clock. Yet, the invention is applicable to other timing sequences as well.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. An improved data transfer system for a plurality of network processors using a dynamic random access memory (DRAM) storage comprising:
   a) a pair of DDR DRAM chips in parallel, each capable of moving data on the rising and falling edges of a time clock; and
   b) a multiplexor to allow four memory banks of data to be "read" by each network processor followed by four memory banks to be 'written' by each network processor during one 20 cycle cell of said time clock.

2. The system according to claim 1 further including a serial bus and pipelines for the transfer of the 'read' data and the 'write' data between the two DDR DRAMS and the respective network processor.

3. The system according to claim 1 further including a plurality of fixed size data store buffer.

4. The system according to claim 3 wherein each of the buffers is a 64 byte buffer, and each memory bank comprises ¼ of the data store DRAM.

5. A method of storing and moving data for use by a network processor comprising the steps of:
   a) storing the data in first and second DDR DRAM chips working in parallel and having synchronized clocks;
   b) establishing a data movement pattern comprising a predetermined number of cycles in each repeating cell of the DDR DRAM clocks;
   c) dedicating a contiguous group of cycles in the pattern to full 'read' during a 'read' window; and
   d) dedicating a second contiguous group of cycles in the pattern to fill 'write' during a 'write' window.

6. The method according to claim 5 including the additional step of storing data from each read window or from each write window to a data store in a buffer.

7. The method according to claim 6 including a plurality of buffers wherein each window comprises a burst of 64 bytes of data and each buffer has a store capacity of 64 bytes.

8. The method according to claim 5 further including the step of pipelining to allow four banks of data to be read during the 'read' window, followed by four banks of data to be written during the 'write' window.

9. The method according to claim 8 wherein the data is read or is written in bursts of 64 bytes.

10. An arbitration method for a network processor for providing a high bandwidth movement of data for multiple frames being serviced by the network processor irrespective of frame size, comprising the steps of:
   a) establishing time slots for reading each of the banks a, b, c, and d in a DRAM chip, and separate time slots for writing each of the banks a, b, c and d;
   b) determining which of the banks need to be read and which of the banks need to be written for a given frame;
   c) accessing only the banks that are required by said given frame;
   d) reviewing all frames needing 'read' access during each time slot;
   e) arbitrating for all 'a' banks between all frames needing 'read' access to the 'a' banks; and
   f) sequentially arbitrating for all 'b', 'c', and 'd' banks for a frame requiring access to the 'b', 'c', and 'd' banks.

11. The arbitration method according to claim 10 further including repeating steps d), e) and f) for all frames needing 'write' access.

12. A method of providing a network processor with random 'read' and 'write' access to a plurality of banks a, b, c and d of a DRAM chip comprising the steps of:
   a) during a 'read' window, arbitrating to give priority to bank 'a' for any 'read' commands that need to be fulfilled;
   b) if no 'read' access is available from a bank 'a', giving bank 'a' access to a 'write' command, and
   b1) giving the 'write' access to the next bank 'b';
   c) if bank 'b' access is different than the access of bank 'a', bypassing bank 'b' and giving access to bank 'c'; and
   d) modifying arbitration to give priority to bank 'c' regardless of whether it is 'read' or 'write'.

13. The method according to claim 12 wherein, if a 'read' access is available from bank 'a', in step a), then giving bank 'b' 'read' access after the 'a' bank is read.

14. The method according to claim 12 wherein steps a)–d) are repeated during a 'write' window.

15. The method according to claim 12 including using the random access for control information.

* * * * *